3,181,873
HIGH TORQUE, HIGH SPEED ROTARY FEED-
THROUGH SEAL FOR ULTRAHIGH VACUUM
CHAMBERS
Malcolm E. Reed, Westwood, Mass., assignor, by mesne assignments, to National Research Corporation, Cambridge, Mass., a corporation of Massachusetts
Filed Jan. 25, 1962, Ser. No. 168,627
4 Claims. (Cl. 277—3)

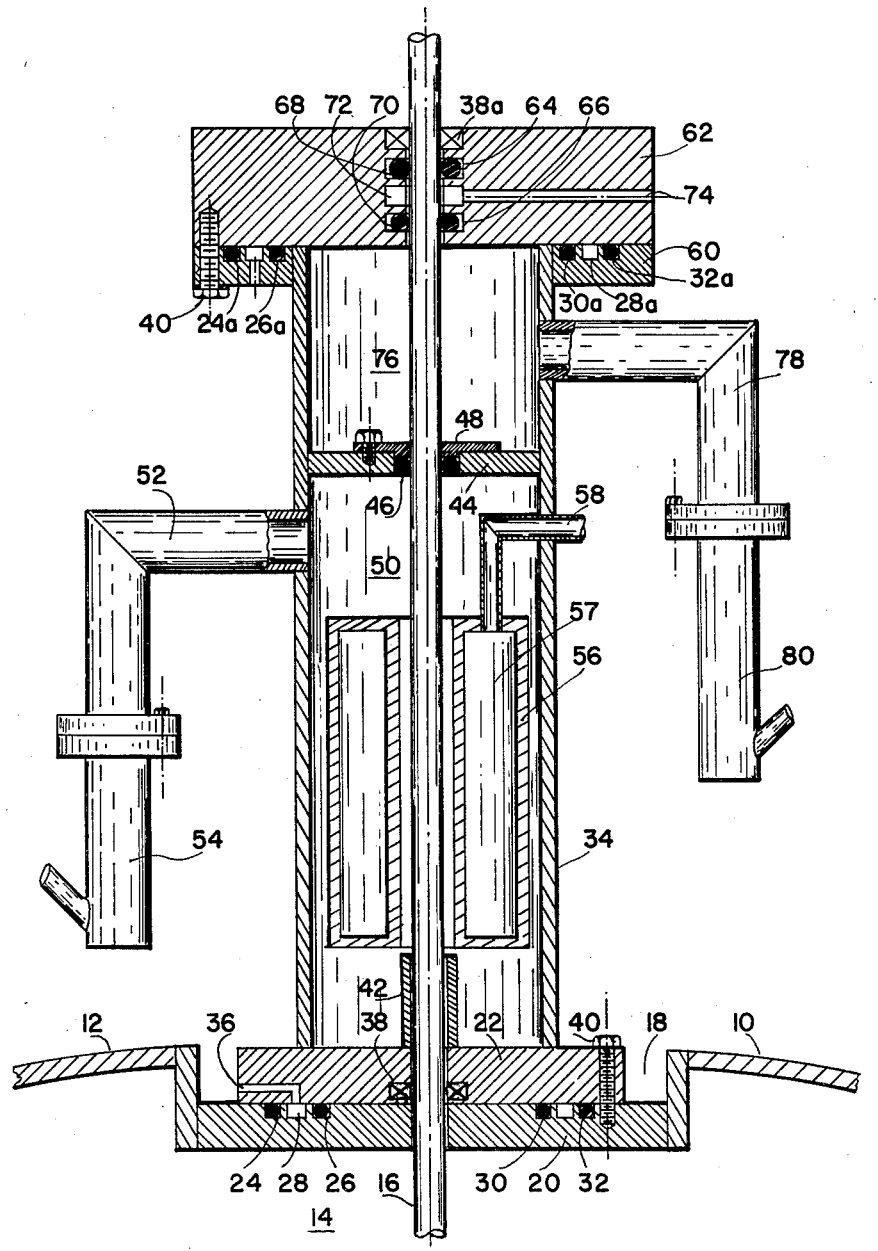

The present invention relates in general to seals and sealing, and has a more particular reference to the provision of an apparatus for sealing rotating shaft-like members which extend through the walls of an ultra-high vacuum vessel.

The problem of introducing motion into an ultra-high vacuum system or transmitting motion from the interior of a pressurized vehicle to an exterior space environment is a difficult one. One of the most complex problems in the technology of ultra-high vacuum systems is the development of a satisfactory rotational seal. Several types are commonly used at the present time in conventional vacuum systems (of $10^{-5}$ mm. Hg range). For example, the bellows type seal and the rubber and vacuum grease sealed shafts are commonly used in conventional systems. A third type, the magnetic coupling, has found application mostly in laboratory work and glass systems. The foregoing types of seals, however, present many disadvantages. The bellows type seal when employed for transmitting motion into an ultra-high vacuum system presents several problems. Because of the thin material used for the bellows a very careful technique is required to attach the seal to an ultra-vacuum system so that it is leak free. Also, the thin material of the bellows may have a tendency to have pinhole leaks. Furthermore, the best bellows commercially available at the present time will endure only a few million motions. At a speed of a few thousand revolutions per minute this would represent a lifetime of only a few days. This type of seal gives a lowest limit of attainable pressure of approximately $10^{-7}$ mm. Hg when sealed to systems with rubber gaskets.

The rubber and vacuum grease sealed shafts, which consist usually of two rubber O-rings or plates which are placed against the shaft with some type of vacuum grease injected between the rubber surfaces, also present disadvantages when used in ultra-high vacuum systems. For example the force pressing the rubber against the shaft is critical in obtaining a good seal. An important limiting factor of this seal, as with the bellows seal, is the outgassing of the seal elements. From available data this type of seal gives a lowest limit of attainable pressure of approximately $10^{-7}$ mm. Hg.

While the magnetic coupling type seal can be used in ultra-high vacuum systems, this seal is greatly limited since the torque which can be transmitted is highly dependent upon the distance between the magnets. Additionally the springy connection between the magnets does not permit a positive drive. Accordingly, the magnetic type seal is limited to introducing small torque values; for example, a few foot pounds at high rotational speed.

Accordingly, a principal object of the present invention is to provide an improved seal structure for sealing rotating shaft like members against the leakage of fluid along the member which extends through the wall of an ultra high vacuum vessel.

Another object of the present invention is to provide a seal which can transmit high torque values at variable speeds to ultra-high vacuum systems.

A further object of the present invention is to provide a seal for introducing motion to an ultra-high vacuum system and which is not substantially effected by outgassing of the sealing elements.

Other objects of the invention will in part be obvious and will in part appear hereinafter.

The invention accordingly comprises the apparatus possessing the construction, combination of elements, and arrangement of parts which are exemplified in the following detailed disclosure and the scope of the application of which will be indicated in the claims.

In accordance with the present invention, as broadly stated, the above objects are achieved and the disadvantages of the prior art overcome by providing a series of sealing chambers and vacuum diffusion pumps associated with the sealing chambers along the rotating shaft which extends through the wall of an ultra-high vacuum system. An important feature of the present invention is that at least two sealing chambers are provided although additional sealing chambers may be employed.

The first sealing chamber is arranged around the shaft member and adjacent to the opening in the wall of the ultra-high vacuum vessel through which the shaft extends. This first sealing chamber is maintained at a pressure on the order of the ultra-high vacuum which prevails in the vacuum vessel. To this end the first sealing chamber is provided with a vacuum pump for evacuating the chamber to a low pressure. Within the first sealing chamber there is also provided a cold surface for adsorbing condensable gases. Also within the first sealing chamber there is provided sleeve means surrounding the shaft and extending a substantial distance along the shaft in close proximity thereto to provide a high impedance gas flow path. Adjacent to the first sealing chamber and around the shaft member there is provided a second sealing chamber. The second sealing chamber is also provided with a vacuum pump for evacuating the second chamber to a low pressure. The second sealing chamber is maintained, for example, at a high vacuum on the order of $10^{-7}$ mm. Hg. One important feature of the second sealing chamber is that, when the second sealing chamber forms the terminal sealing chamber along the shaft, it provides a low pressure stage between the atmosphere and the first sealing chamber. This permits the first sealing chamber adjacent the vacuum vessel to be maintained at a pressure on the order of the pressure in the vacuum vessel. The seal in accordance with the present invention provides the advantage of being leak free since gases are removed before they could enter the ultra-high vacuum system. Also the seal has no torque or rotational motion limitations.

The present invention can best be understood by reference to the drawing which is a diagrammatic, schematic, sectional view of one preferred embodiment of the invention wherein the walls 10 and 12 define the high vacuum chamber 14. 16 designates any suitable shaft to which the sealing apparatus of the present invention is to be applied, said shaft passing through the opening 18 of the vacuum chamber 14. The first sealing means for sealing the clearance between the shaft and the walls of the vacuum chamber preferably comprises a lower flange 20 and an upper flange 22 which surround the shaft in close proximity thereto. The lower flange 20 is preferably provided with two recesses 24 and 26 and a channel 28 which preferably has a rectangular cross section. Positioned in recesses 24 and 26 are gaskets 30 and 32. The gaskets 30 and 32 are preferably of the O-ring type and may be composed of rubber, neoprene, polymerized vinyl chloride or related synthetic rubbery elastic materials. The upper flange 22 which is attached to housing 34 is preferably provided with a channel 36. Flange 22 also contains bearings 38, through which shaft 16 is journalled. The flanges, when secured together as by bolts or screws 40, cooperate with the gaskets and the channel spaces to provide a conduit for a cooling liquid to cool the gaskets. The cooling of the gasket material serves to reduce the outgassing of such material whereby higher vacuum values are achieved. Extending along shaft 16 is a sleeve 42 which surrounds the shaft and preferably cooperates with flanges 20 and 22 to provide an impedance to fluid flow along the shaft. The sleeve is constructed and arranged to have a clearance between the shaft and the sleeve of less than about .020 inch and preferably less than .015 inch. In this manner there is provided a high impedance gas flow path, the clearance through which is less than one thousandth and preferably on the order of one millionth the mean free path of the gas molecules when at a pressure of less than $10^{-6}$ mm. Hg and for a sleeve length of between 1 to 2 inches. The only requirement for the minimum clearance of the sleeve is that it should not impede the rotary motion of the shaft.

The second sealing means which is mounted around the shaft 16 comprises a support or retaining plate 44, a gasket 46 and a collar or sealing plate 48. Plate 48 compresses the gasket 46, which is preferably an O-ring, into sealing engagement with shaft 16 to provide a fluid tight seal between said gasket and the shaft while permitting rotary movement of the shaft. The gasket 46 is preferably constructed of a material having a low outgassing quality such as Teflon.

The first and second seal means described above together with the housing 34 define a first sealing chamber 50. Sealing chamber 50 is connected by vacuum line 52 preferably to a vacuum diffusion pump 54 of sufficient capacity to maintain a vacuum in chamber 50 on the order of the vacuum which is maintained within the main chamber 14. Vacuum diffusion pump 54 is connected to a suitable backing pump (not shown).

Positioned within sealing chamber 50 is a cold surface 56. The cold surface 56 is preferably an annular chamber which surrounds the shaft 16 in close proximity thereto. The cold surface 56 is connected by conduit means 58 to a source (not shown) of cooling fluid which is to be maintained in space 57 in cooling relationship with surface 56 to lower the temperature thereof. Preferably the cooling fluid is a cryogenic liquid such as liquid nitrogen. The cold surface operates as a pump for condensable gases and cooperates with vacuum pump 54 to provide a high vacuum in sealing chamber 50.

A third seal means is mounted around shaft 16. This seal arrangement comprises a lower flange 60 and outer bearing head 62 which surround the shaft in close proximity thereto. The lower flange 60 is preferably provided with recesses $24_a$ and $26_a$ and channel $28_a$ similar to lower flange 20 of the first seal means. Gaskets $30_a$ and $32_a$, which are similar to gaskets 30 and 32, are positioned in recesses $24_a$ and $26_a$. The outer bearing head 62 is preferably provided with two recesses 64 and 66 which support gaskets 68 and 70 into sealing engagement with shaft 16 to provide a fluid tight seal between the gaskets and the shaft 16 while permitting rotary movement of the shaft. The bearing head is preferably provided with a recess or groove 72 which cooperates with the shaft to form a channel 72 in which a cooling liquid or lubricant is circulated. Conduit 74 communicates with channel 72 and permits introduction of the cooling liquid or lubricant. The gaskets 68, 70 are preferably of the O-ring type as described above. Bearing head 62 also contains bearings $38_a$ through which the shaft is journalled.

The second and third seal means described above together with the housing 34 define a second sealing chamber 76. Sealing chamber 76 is preferably connected by a vacuum line 78 to a vacuum diffusion pump 80 of sufficient capacity to maintain a vacuum in chamber 76 on the order of the vacuum which is maintained within the first sealing chamber 50. Vacuum pump 80 is connected to a suitable backing pump (not shown).

In operation of the present invention gases in sealing chamber 76 are removed by vacuum pump 80. These gases may originate from the atmosphere and from outgassing of the gaskets, grease and walls of the sealing chamber. In this manner the sealing chamber 76 is maintained at a pressure on the order of $10^{-7}$ mm. Hg abs. Any gases which pass through the second seal means and any outgassing within sealing chamber 50 are removed by pump 54. Condensable gases which are not removed from sealing chamber 50 by the pump are condensed on the cold surface 56. In this manner sealing chamber 50 is maintained at a pressure on the order of $10^{-8}$ to $10^{-9}$ mm. Hg abs. Gases which are not condensed on the cold surface or removed from the sealing chamber 50 are substantially prevented from entering the vacuum vessel by sleeve 42 which provides a high impedance gas flow path.

A rotary seal constructed as described above and illustrated in the drawing was connected to an ultra-high vacuum chamber. The first and second sealing chambers were each evacuated by a 2-inch vacuum diffusion pump. Liquid nitrogen was maintained in space 57 of the annular cold surface 56 positioned in the first sealing chamber. A ½ inch diameter shaft was continuously operated for approximately a week at rotational speeds of up to 175 r.p.m. with a torque capability of 200 inch pounds. During this operation time the second sealing chamber was maintained at a pressure on the order of $10^{-7}$ mm. Hg abs., and the pressure in the first sealing chamber on the order of $10^{-8}$ to $10^{-9}$ mm. Hg abs. After the initial pump down the ultra-high vacuum vessel was maintained at a vacuum on the order of $2 \times 10^{-9}$ mm. Hg abs.

While a preferred embodiment of the invention has been described above, it should not be limited thereto. For example, the cold surface may consist of a series of plates or baffles of suitable configuration to impede the flow of gas and to absorb condensable gases. The gaskets need not be O-rings but may have other shapes. Additionally, the flanges need not be flat but may have curvature and/or discontinuities. Where removability of the drive seal from the ultra-high vacuum system is not necessary or desirable, the upper and lower flanges of the first sealing means can be welded together.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. An apparatus for providing rotary movement of a drive shaft at high torque and high speed through the defining wall of a vacuum chamber, comprising a rotatable shaft extending through an opening in the wall of said vacuum chamber, a first means for sealing the clearance between the rotatable shaft and the wall of said vacuum chamber, a housing adjacent said opening and surrounding said shaft, a second seal means mounted around said shaft in spaced relation with said first sealing means, said two seal means and said housing defining a first sealing chamber, means connected with said first sealing chamber to maintain said first sealing chamber at a low pressure, a cold surface in said first sealing chamber for adsorbing condensable gases, means for maintaining a cryogenic fluid in cooling relationship with said surface to lower the temperature thereof, a third seal means around said shaft, said third seal means being in spaced relation with said second seal means, said second and third seal means defining a second sealing chamber with said housing and means connected with said sealing chamber to maintain said second sealing chamber at a low pressure, whereby the apparatus permits operation of the chamber at ultrahigh vacuum.

2. An apparatus for providing rotary movement through the defining wall of a vacuum chamer to be maintained at a pressure on the order of $10^{-9}$ mm. Hg abs., comprising a rotatable shaft extending through an opening in the wall of said vacuum chamber, a first means for sealing the clearance between the rotatable shaft and the wall of said vacuum chamber, a housing adjacent said opening and surrounding said shaft, a second seal means mounted around said shaft and in spaced relation with said first seal means, said first and second seal means and said housing defining a first sealing chamber, a sleeve means within said first sealing chamber and associated with said first seal means, said sleeve means surrounding said shaft and extending a substantial distance long said shaft in close proximity thereto to provide an impedance to fluid flow along said shaft, a cold surface positioned in said first sealing chamber for adsorbing condensable gases, means for providing a supply of liquid nitrogen in cooling relationship with said cold surface, means connected with said first sealing chamber for evacuating gases from said first sealing chamber, a third seal means around said shaft, said third seal means being in spaced relation with said second seal means, said second and third seal means and said housing defining a second sealing chamber and means connected with said sealing chamber for evacuating gases from said second sealing chamber.

3. An apparatus for providing rotary movement through the defining wall of a vacuum chamber to be maintained at a pressure on the order of $10^{-9}$ mm. Hg abs., comprising a rotatable shaft extending through an opening in the wall of said vacuum chamber, a first means for sealing the clearance between the rotatable shaft and the wall of said vacuum chamber, a housing adjacent said opening and surrounding said shaft, a second seal means mounted around said shaft and in spaced relation with said first seal means, said first and second seal means and said housing defining a first sealing chamber, a sleeve means within said first sealing chamber and associated with said first seal means, said sleeve means surrounding said shaft and extending a substantial distance along said shaft in close proximity thereto to provide an impedance to fluid flow along said shaft, a cold surface positioned in asid first sealing chamber for adsorbing condensable gases, means for maintaining said cold surface at cryogenic temperatures for removing condensable gases, means connected with said first sealing chamber for evacuating gases from said first sealing chamber, a third seal means around said shaft, said third seal means being in spaced relation with said second seal means, said second and third seal means and said housing defining a second sealing chamber and means connected with said sealing chamber for evacuating gases from said second sealing chamber.

4. The apparatus of claim 3 wherein the clearance of the sleeve means with said shaft is less than about .020 inch.

References Cited by the Examiner
UNITED STATES PATENTS

| | | | |
|---|---|---|---|
| 2,567,479 | 9/51 | Hebard | 277—105 |
| 2,982,106 | 5/61 | Ambler | 62—9 |

FOREIGN PATENTS 784,735   10/57   Great Britain.

OTHER REFERENCES

Beams, J. W.: Ultrahigh-Speed Rotation, Scientific American 204(4), page 141, April 1961.

LEWIS J. LENNY, *Primary Examiner.*

WALTER A. SCHEEL, SAMUEL ROTHBERG,
*Examiners.*